United States Patent
Hertzman et al.

(10) Patent No.: US 11,722,755 B2
(45) Date of Patent: Aug. 8, 2023

(54) DUAL-HEAD DOME CAMERA

(71) Applicant: Axis AB, Lund (SE)

(72) Inventors: Andreas Hertzman, Lund (SE); Åke Södergård, Lund (SE); Magnus Ainetoft, Lund (SE)

(73) Assignee: Axis AB, Lund (SE)

( * ) Notice: Subject to any disclaimer, the term of this patent is extended or adjusted under 35 U.S.C. 154(b) by 186 days.

(21) Appl. No.: 17/029,319

(22) Filed: Sep. 23, 2020

(65) Prior Publication Data
US 2021/0099619 A1    Apr. 1, 2021

(30) Foreign Application Priority Data
Sep. 26, 2019    (EP) .................................... 19199897

(51) Int. Cl.
*H04N 23/51*    (2023.01)
*H04N 23/45*    (2023.01)
*H04N 23/54*    (2023.01)
*H04N 23/56*    (2023.01)
*H04N 23/695*    (2023.01)

(52) U.S. Cl.
CPC ............. *H04N 23/51* (2023.01); *H04N 23/45* (2023.01); *H04N 23/54* (2023.01); *H04N 23/56* (2023.01); *H04N 23/695* (2023.01)

(58) Field of Classification Search
CPC .. H04N 5/2252; H04N 5/2253; H04N 5/2256; H04N 5/2258; H04N 5/23299
See application file for complete search history.

(56) References Cited

U.S. PATENT DOCUMENTS

| | | | |
|---|---|---|---|
| 6,268,882 B1* | 7/2001 | Elberbaum | G08B 13/1963 348/E7.087 |
| 2001/0022627 A1* | 9/2001 | Bernhardt | G08B 13/19619 348/E7.087 |
| 2007/0090282 A1 | 4/2007 | Chin et al. | |
| 2012/0092504 A1 | 4/2012 | Murphy et al. | |
| 2013/0287385 A1* | 10/2013 | Andersson | G03B 37/02 396/427 |
| 2015/0281650 A1* | 10/2015 | Mohan | G03B 17/08 348/143 |
| 2018/0020206 A1* | 1/2018 | Sheridan | H04N 13/327 |
| 2018/0165930 A1* | 6/2018 | Hertzman | G03B 17/12 |
| 2018/0165932 A1 | 6/2018 | Larsson et al. | |

FOREIGN PATENT DOCUMENTS

| | | |
|---|---|---|
| AU | 2015282374 A1 | 5/2016 |
| EP | 3333816 A1 | 6/2018 |
| KR | 10-2010-0023100 A | 3/2010 |
| KR | 20100023100    * | 3/2010 |
| WO | 2019/128234 A1 | 7/2019 |

OTHER PUBLICATIONS

Extended European Search Report dated Jan. 2, 2020, for the European Patent Application No. 19199897.0.

\* cited by examiner

Primary Examiner — Kathleen V Nguyen
(74) Attorney, Agent, or Firm — Volpe Koenig

(57) ABSTRACT

A dome camera has a base, two camera heads and a dome cover. The base is configured for mounting the dome camera to a surface. The two camera heads are arranged on the base. The dome cover is arranged over the camera heads and the base. The dome cover includes at least two dome-shaped sections, wherein each dome-shaped section covers a camera head, and a center section joining the dome-shaped sections. The dome cover is formed in a single piece.

8 Claims, 4 Drawing Sheets

DUAL-HEAD DOME CAMERA

TECHNICAL FIELD

The present invention relates to monitoring cameras, and in particular to monitoring cameras having multiple camera heads.

BACKGROUND

Monitoring cameras are used in many different applications, both indoors and outdoors, for monitoring a variety of environments. Digital monitoring cameras sometimes use multiple camera heads to enable more precise capturing of an area being monitored. For example, while a conventional Pan Tilt Zoom (PTZ) camera mounted in a hallway intersection is capable of capturing images down the length of each hall, one hallway at a time, a dual-head camera could be deployed, with one camera covering each of the four hallways that intersect. As a result, multi-head megapixel cameras provide a higher level of overall situational awareness and security in this and many other deployment examples.

To prevent damage to the camera heads, various types of protective covers, typically made from plastic, such as polycarbonate or acrylic, are often applied to shield the cameras. There are many types and shapes of protective covers. For example, Australian patent publication AU 2015282374 shows a dual camera having two fisheye lenses and a protective cover in the shape of a single, half-sphere shaped dome. U.S. Patent Publication No. 20180165932, which is assigned to the assignee of the present application, shows a monitoring camera arrangement with four camera heads placed within a protective cover having a toroidal shape.

While these various types of protective covers generally serve their purpose well of protecting the camera heads, their particular shape may also impose limits on how small the overall size of the camera can be and how the placement of components inside the camera can be done. It would therefore be desirable to have a protective cover that allows for an overall size reduction of a dual head camera, as well as increased flexibility with respect to the placement of sensors and other components within the camera.

SUMMARY

Providing a dual-head dome camera, which has a protective cover that allows for more efficient use of space compared to conventional dual-head dome cameras would be beneficial.

A dome camera having a base, two camera heads and a dome cover, whereby the base is configured for mounting the dome camera to a surface. The two camera heads are arranged on the base. The dome cover is arranged over the camera heads and the base. The dome cover includes at least two dome-shaped sections, wherein each dome-shaped section covers a camera head, and a center section joining the dome-shaped sections. The dome cover is formed in a single piece. With such a camera, it is possible to achieve a more compact dome camera design, as it allows the camera heads to be moved closer to each other. This also increases the various uses of the camera, as it can be mounted in a smaller space than what would otherwise be possible. Furthermore, having a single dome cover that is capable of covering several camera heads also simplifies manufacturing and assembly compared to situations where several smaller dome covers need to be used.

According to one embodiment, the dome cover is at least partly transparent. This allows visible light to pass through the dome cover and reach the camera heads. At the same time, sections of the dome cover that may not be used by the camera heads can be made opaque, which may have a more aesthetically pleasing appearance, for example, in terms of concealing cables and other internal components.

According to one embodiment the dome cover is made out of plastic. Plastic is a relatively cheap, durable, material that has good optical characteristics and can be formed in a number of shapes. Therefore, it is also suitable to use in a wide range of environments in which the dual head camera may be installed.

According to one embodiment, the plastic is transparent to infrared light. This increases the use scenarios for the dual head camera, as not only visible light sensors, but also infrared sensors and illumination sources can be mounted inside the dome camera and thereby be protected from the external environment.

According to one embodiment, the camera may include one or more infrared illumination sources mounted inside the dome camera. Some of the associated advantages have been described in the above paragraph.

According to one embodiment, the dome camera may include a bracket that is mounted inside the center section of the dome cover and is attached to the base. This bracket serves to provide additional structural support for the dome cover, which is important in scenarios where there is a risk of unintentional or intentional damage being made to the dome camera. In addition, the bracket can conceal cables and various connectors that might otherwise be visible through the dome cover, thereby giving the dome camera a more aesthetically pleasing appearance.

According to one embodiment, at least a portion of wiring for the two camera heads passes beneath the center section of the dome to an electronics unit of the dome camera. That is, the center section of the dome camera can be used to place components of the camera (e.g., an RJ45 connector along with sufficient room for cable routing), thereby making the design of the dome camera even more compact and space-efficient compared to current designs.

According to one embodiment, the base and dome cover are provided as separate units held together by a fastening means. This simplifies the installation of the camera onto a surface, such as a wall or ceiling, since the base can be mounted first and then the dome cover can be added once the base is in place.

According to one embodiment, the fastening means include two or more screws and a cover ring. This also simplifies installation of the camera as conventional tools may be used by the person installing the camera.

According to one embodiment, the infrared illumination sources are mounted on the base and comprise an anti-reflection component configured to reduce the amount of light from the infrared illumination sources being reflected to the camera heads. Reducing the amount of reflection captured by the camera heads can help to significantly improve the image quality of the camera.

According to one embodiment, each camera head is configured to move around a pan axis and a tilt axis, respectively. The pan axis and tilt axis intersect at a point that is located at an approximately equal distance from any point on the dome-shaped section covering the camera head. That is, the pan axis and tilt axis for a camera intersect at a point that essentially coincides with a center of an imaginary sphere of which the dome cover forms a part. By being able to pan and tilt the camera and always maintain an essentially equal distance between the camera head the dome cover it is possible to minimize various types of image distortions that otherwise might occur if the distance between the camera head and the dome cover was variable.

A further scope of applicability of the present disclosure will become apparent from the detailed description given below. However, it should be understood that the detailed description and specific examples, while indicating preferred embodiments, are given by way of illustration only, since various changes and modifications within the scope of the disclosure will become apparent to those skilled in the art from this detailed description.

Therefore, it is to be understood that this disclosure is not limited to the particular component parts of the device described or steps of the methods described as such device and method may vary. It is also to be understood that the terminology used herein is for purposes of describing particular embodiments only, and is not intended to be limiting.

As used in the specification and the appended claims, the articles "a," "an," "the," and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

The details of one or more embodiments are set forth in the accompanying drawings and the description below. Other features and advantages will be apparent from the description and drawings, and from the claims.

BRIEF DESCRIPTION OF THE DRAWINGS

A more detailed understanding may be had from the following description, given by way of example, in conjunction with the accompanying drawings where.

DETAILED DESCRIPTION

As was described above, the various embodiments provide a dual-head dome camera, which has a protective cover that allows for more efficient use of space compared to conventional dual-head dome cameras.

Figure 1:
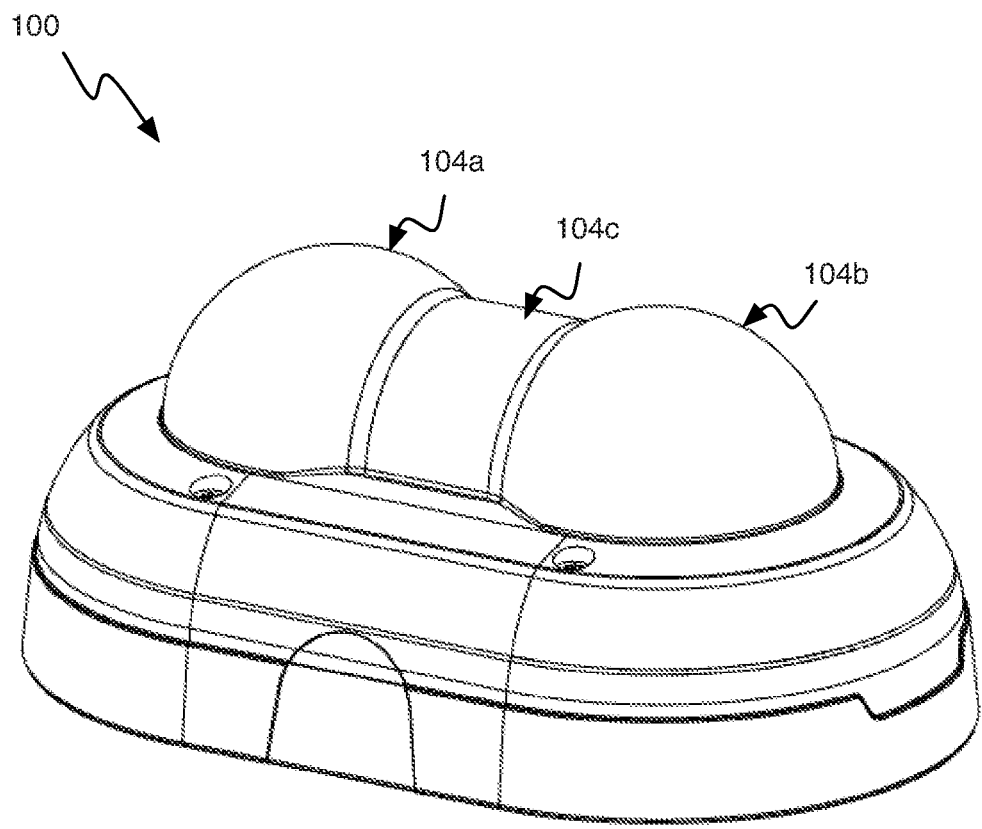
FIG. 1 is a perspective view of a dual head dome camera in an assembled configuration, in accordance with one embodiment.

FIG. 1 shows a perspective view of a dual head dome camera 100 (hereinafter referred to as a "dome camera") in an assembled configuration, in accordance with one embodiment. To better understand the functioning of the dome camera 100, reference will now be made to FIG. 2, which shows an exploded view of some of the components of the dome camera 100.

Figure 2:
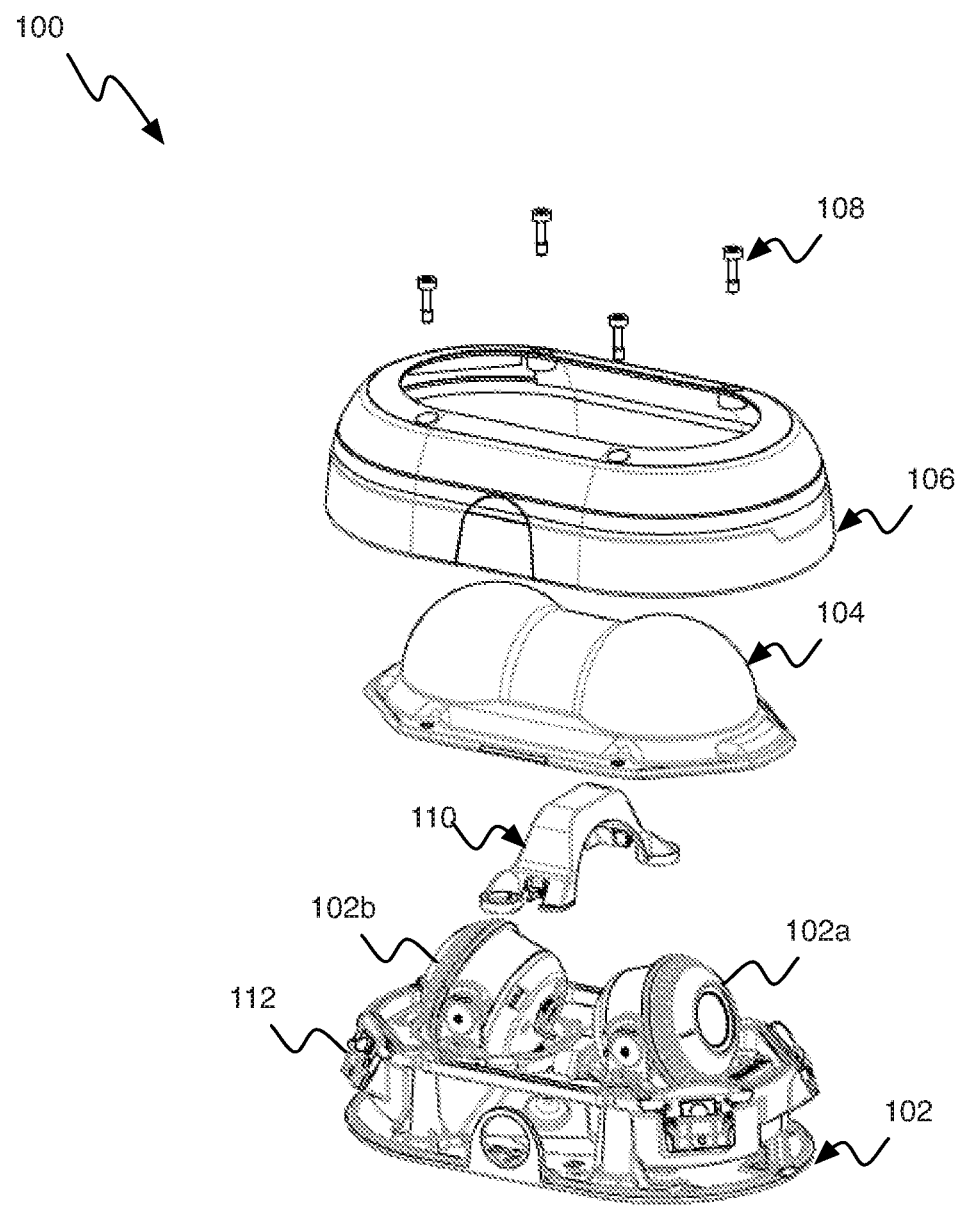
FIG. 2 is an exploded view of the camera of FIG. 1.

As can be seen in FIG. 2, the dome camera 100 includes a base 102, a dome cover 104, a cover ring 106, fastening means 108, and a bracket 110. The base 102 includes two camera heads 102a and 102b that can rotate around a pan and a tilt axis, respectively, to cover varying areas of surveillance when in operation. The pan axis and tilt axis for each camera intersect at a point that is located at an approximately equal distance from any point on the dome-shaped section 104a, 104b, covering the camera head 102a, 102b. Expressed differently, the pan axis and tilt axis for a camera 102a, 102b, intersect at a point that essentially coincides with a center of an imaginary sphere of which the dome cover 104a, 104b forms a part. As was mentioned above, by being able to pan and tilt the camera and always maintain an essentially equal distance between the camera head the dome cover, it is possible to minimize various types of image distortions that otherwise might occur if the distance between the camera head and the dome cover was variable.

Figure 3:
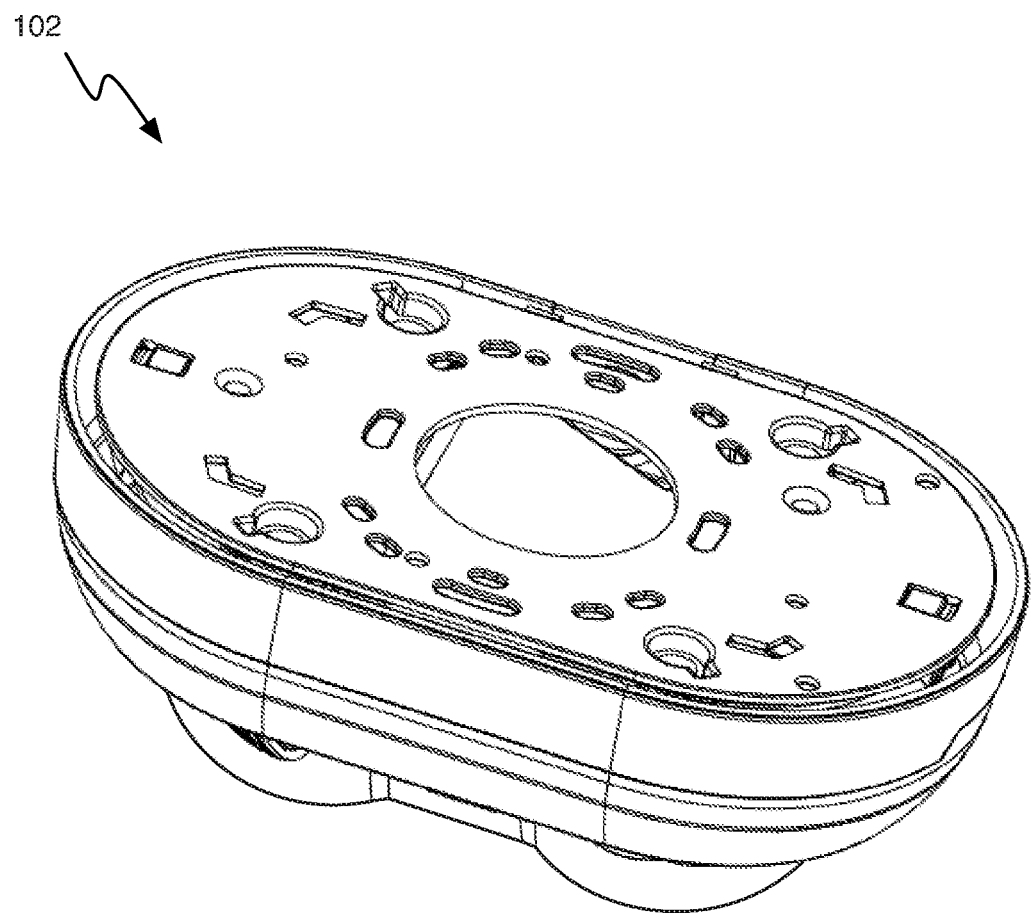
FIG. 3 is a bottom perspective view of the camera base of the camera of FIG. 1.

FIG. 3 shows a bottom perspective view of the camera base 102. The base 102 has a number of holes of varying sizes, which allows the base 102 to be mounted to a variety of surfaces, such as walls, ceilings, etc., using conventional hardware such as screws. Larger holes are also provided in the base 102 to accommodate various types of wiring that is necessary for operating the camera, such as electrical cables and data cables.

The dome cover 104, is made of a transparent material, such as polycarbonate. The dome cover has two separate "semi-spheres" 104a, 104b that are separated by a central section 104c. FIG. 1 clearly shows the three sections of the dome cover 104. The shape of the dome cover 104 makes it possible to tilt the two camera heads 102a and 102b located below semi-spheres 104a and 104b, respectively, at various angles, such that they may be pointed anywhere between essentially horizontal and essentially vertical, without the distance to the inside of the dome cover 104 changing for either camera head 102a, 102b. In this manner, it is possible to reduce optical aberrations, image distortion and disturbing lines in the images.

The center section 104c of the dome cover 104 covers the central portion of the base 102, where various types of cables and electrical connectors may be located. Being able to use this space between the camera heads for such purposes allows for a more compact overall design of the camera.

In some embodiments, an optional bracket 110 can also be provided below the center section 104c of the dome cover 104. The bracket 110 is typically made of an opaque material, such as plastic, and can serve several purposes. For example, the bracket may be used to conceal various types of connectors and cables, thereby improving the visual appearance of the camera. In addition, surveillance cameras often have certain requirements with respect to being able to withstand external forces, for example, to prevent vandalism or if they are accidentally hit by some object. Having a bracket 110 can increase the amount of pressure the dome cover 104 can withstand, and therefore also protect the camera heads 102a, 102b, and the electronics inside the camera dome 104 better. In some embodiments, the bracket 110 can be made out of metal, which is particularly useful in situations where it is important to both cover electronic components and provide damage from excessive forces applied to the dome cover 104.

In the embodiment of the dome camera 100 shown in FIG. 2, a cover ring 106 and fastening means 108, such as screws, are also provided. The ring 106 and screws 108 serve to keep the base 102 and dome cover 104 held together, and also creates a seal between the dome camera 100 and its exterior. This is particularly important in situations where the dome camera 100 is installed at an outdoor location, where it may be subject to external weather elements such as rain or snow, and also to dust and other elements in the air.

Figure 4:
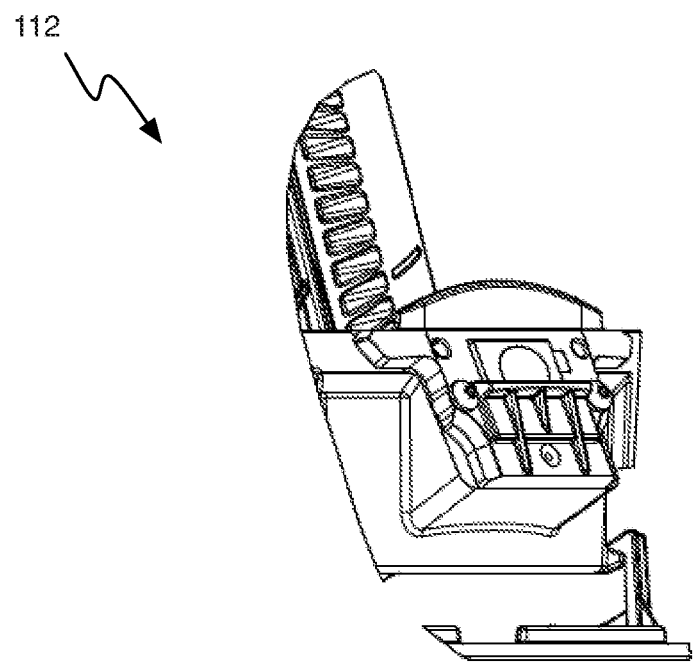
FIG. 4 is a detailed view of an infrared illumination source, in accordance with one embodiment.

In some embodiments, the base 102 of the dome camera 100 may be equipped with one or more infrared illumination sources 112, as shown in FIG. 2. In such a configuration, the dome cover 104 is manufactured such that at least the portion of the dome cover 104 that covers the infrared illumination sources 112, is transparent to infrared light. FIG. 4 shows a detailed view of an infrared illumination source 112 mounted on the base 102, and FIG. 5 shows a further detailed, exploded view, of the infrared illumination source 112, in accordance with one embodiment.

Figure 5:
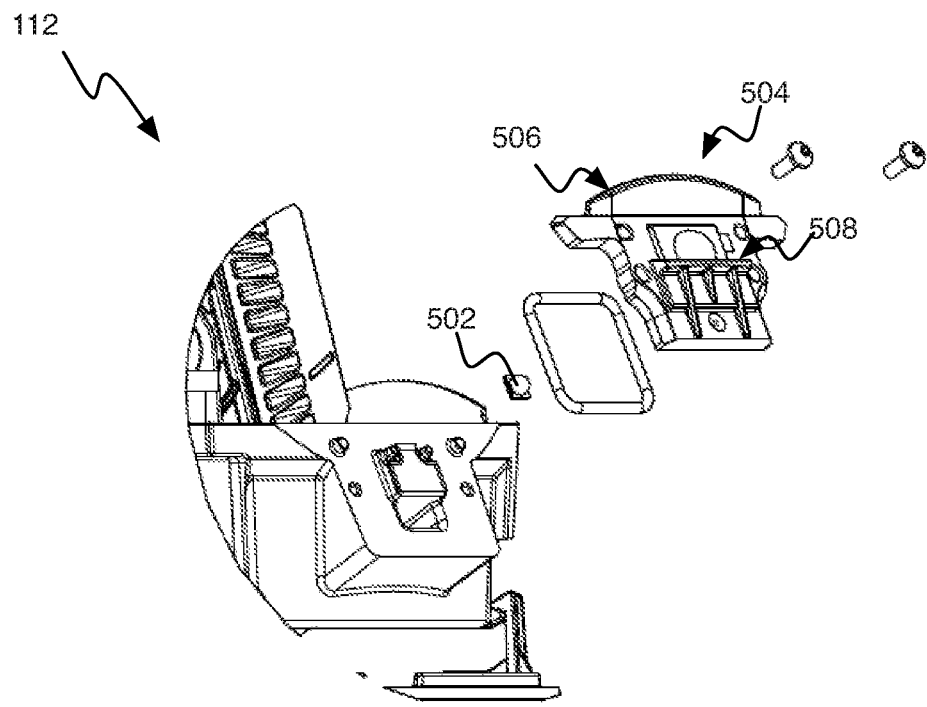
FIG. 5 is an exploded view of the infrared illumination source of FIG. 4; whereby like reference symbols in the various drawings indicate like elements.

As can be seen in FIG. 5, the infrared illumination source 112, has an infrared light emitting diode (IR LED) 502. When assembled, the IR LED 502 is surrounded by an anti-reflection component 504, which serves to reduce the amount of light that gets reflected to the camera heads 102a, 102b, when the IR LED 502 is in use. In particular, the anti-reflection component 504 has a first edge 506 that blocks light from going up into the dome cover 104 and being reflected to the camera heads 102a, 102b, and a second edge 508 that blocks light from being reflected from inside the cover ring to the camera heads 102a, 102b. As the skilled person realizes, the anti-reflection component 504, and in particular the first and second edges 506, 508, may have varying appearances based on the particular configuration and placement of the infrared illumination sources 112 on the camera base 102. Thus, many adaptations can be made by persons having ordinary skill in the art.

When mounting the dome camera 100, the base 102 is attached to the surface on which the dome camera 100 should be placed (e.g., a wall or a ceiling). All cables are then connected, as appropriate, and the bracket 110 is put in place. The dome cover 104 is placed on the base 102 and is secured by the cover ring 106 to the base 102 by a number of screws 108.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. Thus, many other variations that fall within the scope of the claims can be envisioned by those having ordinary skill in the art.

The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A dome camera, comprising:
a base for mounting the dome camera to a surface;
two camera heads arranged along a straight line on the base;
a dome cover arranged over the camera heads and the base; and
a bracket arranged beneath the dome cover;
wherein:
the dome cover has two dome-shaped sections, each section covering a camera head, and a center section joining the dome-shaped sections,
the center section is located approximately half-way between the two camera heads and has a maximum height with respect to the base that is lower than the maximum height of the dome-shaped sections,
the dome cover is formed in a single piece,
the bracket is mounted inside the center section of the dome cover and is attached to the base, and
each camera head is configured to move around a pan axis and a tilt axis, respectively, the pan axis and tilt axis intersecting at a point that is located at an equal distance from any point of the dome-shaped section covering the camera head, whereby optical aberrations and distortions of images captured by the camera head are minimized.

2. The dome camera of claim 1, wherein the dome cover is at least partly transparent.

3. The dome camera of claim 1, wherein the dome cover is made out of plastic.

4. The dome camera of claim 3, wherein the plastic is transparent to infrared light.

5. The dome camera of claim 1, further comprising one or more infrared illumination sources mounted outside the dome cover.

6. The dome camera of claim 5, wherein the infrared illumination sources are mounted on the base, and comprise an anti-reflection component configured to reduce the amount of light from the infrared illumination sources being reflected to the camera heads.

7. The dome camera of claim 1, wherein the base and dome cover are provided as separate units held together by a fastening means.

8. The dome camera of claim 7, wherein the fastening means comprise two or more screws and a cover ring.

\* \* \* \* \*